United States Patent [19]
Schnabel et al.

[11] Patent Number: 5,752,718
[45] Date of Patent: May 19, 1998

[54] MOTOR VEHICLE FORWARD STRUCTURE HAVING A KNEE RESTRAINT WITH DEFINED YIELDING CAPABILITY

[75] Inventors: Alfred Schnabel, Althengstett; Helmut Patzelt, Kernen; Thomas Witkovsky, Grafenau, all of Germany

[73] Assignee: Mercedes-Benz AG, Germany

[21] Appl. No.: 731,112

[22] Filed: Oct. 9, 1996

[30] Foreign Application Priority Data

Oct. 9, 1995 [DE] Germany ............... 195 37 408.8

[51] Int. Cl.⁶ .................... B60R 21/02; B62D 25/14
[52] U.S. Cl. .................... 280/752; 180/90; 296/72; 188/371
[58] Field of Search ................... 280/752, 751, 280/750, 748; 180/90; 296/70, 72; 188/371, 374, 377

[56] References Cited

U.S. PATENT DOCUMENTS

| | | | |
|---|---|---|---|
| 3,769,851 | 11/1973 | Edme et al. | 188/371 |
| 4,325,268 | 4/1982 | Benteler et al. | 188/371 |
| 4,709,943 | 12/1987 | Yoshimura et al. | 280/751 |
| 4,723,792 | 2/1988 | Sakamoto et al. | 280/751 |
| 5,238,286 | 8/1993 | Tanaka et al. | 296/70 |

FOREIGN PATENT DOCUMENTS

| | | |
|---|---|---|
| 0 479 630 | 4/1992 | European Pat. Off. . |
| 1 952 119 | 6/1970 | Germany ............... 188/371 |
| 44 27 285 | 6/1995 | Germany . |

OTHER PUBLICATIONS

Search Report from GB9620905.1, dated Nov. 25, 1996.

*Primary Examiner*—Peter C. English
*Attorney, Agent, or Firm*—Evenson, McKeown, Edwards & Lenahan, P.L.L.C.

[57] ABSTRACT

A forward structure of a motor vehicle has a cross member which connects the two A-columns with one another and which is used for fixing a steering column and a knee restraint. A strut is fixed on the forward structure and extends from the cross member to a transmission tunnel extending in the longitudinal direction of the vehicle. At least two mutually overlapping strut sections of the strut have a connection area which, under a load during a crash and after overcoming a force threshold, can be elongated in a longitudinal direction while absorbing energy. A force limiting device is provided in the connection area of the strut sections in the force transmission path. Consequently, after the force threshold is exceeded, an energy reduction is achieved during a predetermined lengthening path of the connecting strut and at a constant force level so that a yielding of the impact-loaded knee restraint together with the cross member takes place with a force-limited resistance along a predetermined path distance.

7 Claims, 3 Drawing Sheets

MOTOR VEHICLE FORWARD STRUCTURE HAVING A KNEE RESTRAINT WITH DEFINED YIELDING CAPABILITY

BACKGROUND OF THE INVENTION

The present invention relates to a forward structure of a motor vehicle and more particularly, to a structure having a cross member which connects the two A-columns with one another, for fixing a steering column and a knee restraint, and having a strut which extends from the cross member to a transmission tunnel extending in the longitudinal direction of the vehicle and which has at least two mutually overlapping strut sections whose connection area in the case of a load during a crash can be elongated in the longitudinal direction after overcoming a force threshold while absorbing energy.

In Mercedes-Benz vehicles, the steering column and the knee restraint for the driver and the front passenger are fixed on the vehicle cross member extending between the A-columns in a freely supporting manner in the vehicle transverse direction. A connecting strut projects from the vehicle cross member and is fastened on the transmission tunnel which extends in the longitudinal direction of the vehicle and is shaped out of the floor panel. The strut dampens vibrations introduced into the vehicle cross member and from there into the steering column.

In the event of a vehicle crash, the transmission tunnel is lowered in the known construction and, in the process, by way of the connecting strut, advantageously pulls down the cross member and the steering column. As a result, where, in a lower position, the steering wheel is directed against the occupant and, when stressed by the occupant, does not tilt upwards/toward the front. Thereby, a triggered steering wheel air bag also receives better alignment toward the occupant, and a pushing-away of the air bag over the steering wheel rim can be avoided.

When being stressed by the occupant, the knee restraint yields on its possible path in an energy reducing manner to the extent permitted by the knee restraint's construction in the assigned space. The connecting strut consists of two strut parts which overlap one another in the connection area and which are screwed to one another. One of the connecting struts has an oblong hole to compensate for the spacing tolerances between the vehicle cross member and the transmission tunnel during the fixing of the connecting strut. Also this frictional screwed connection can yield in the event of a crash as a result of the high forces whereby an elongation of the strut is caused.

In the known construction, however, the path of force and the energy reduction resulting from this elongation cannot be predetermined because, for example, the material structure of the struts and the tightening moment of the screw can change the coefficient of friction. For this reason, how far and with which force the knee restraint will yield when stressed by the occupant can be precalculated only imprecisely.

SUMMARY OF THE INVENTION

It is an object of the invention to achieve, in a forward structure of a motor vehicle, a defined yielding of the knee restraint.

This object has been achieved in accordance with the present invention by providing that in the connection area, a force limiting device is provided in the force transmission path, by way of which, after the exceeding of the force threshold, during a predetermined elongation path of the strut, an energy reduction is achieved at a constant force level so that a yielding of the impact-loaded knee restraint together with the cross member takes place with a force-limited resistance along a predetermined path.

Corresponding to a targeted construction, the connection area of the strut parts of the present invention in the event of a tensile load during a crash will yield until a first force threshold is reached while, after overcoming this force threshold, a further elongation with a constant force level is permitted. As the result of the deformation of the force limiting device, more energy is absorbed in the force transmission path.

Therefore, when an impact onto the knee restraint occurs, the stressing of the occupant's knees rises to this force threshold which is below a serious injury. Subsequently, a largest possible elongation path of the connecting strut assures that no higher stressing, which exceeds this threshold value of the occupant's knees, takes place.

The stressing threshold value, like the one for the course of the energy reduction with the further elongation of the connecting strut, can be adjusted by the force limiting device in the force transmission path of the connection area. Therefore, the value can be coordinated in a defined manner to the stressing relationships in the vehicle crash.

To easily implement the force limiting device in the force transmission path in the connection area of two strut sections, to carry out the present invention, the strut sections are constructed as flat profiles which overlap in the connection area and fixed to one another by at least one fastening bolt. The oblong hole, which is provided on at least one strut section, will then have an area into which a fastening bolt is pulled when the strut is stressed by tension. Thereby, this area has a smaller width than the bolt diameter. Along this elongation path, the fastening bolt causes a uniform expansion or deformation of the oblong hole area with a constant force level. This force level characterizes also the stress value for the occupant's knees which impact on the knee restraint, pushes it away from the occupant and thereby causes the strut to elongate.

For a constant course of the movement during the strut elongation, upward-projecting guide edges can be provided on a flat profile for displaceably receiving the other strut section. Likewise, plates with predetermined coefficients of friction can be inserted between mutually displaceable surfaces of the flat profiles.

Another way to provide a force limiting device in the force transmitting path of the connection area of the strut sections is with a connecting tube whose force necessary for a pulling apart while absorbing energy can be predetermined. Also, in the connection area of the strut sections, a rod with a piston on the end could be implemented on a strut section. The rod projects into a tube which is constructed on another strut section. The end section of the tube, during piston displacement, absorbs energy and is expanded by the introduction of force at the same force level.

BRIEF DESCRIPTION OF THE DRAWINGS

These and other objects, features and advantages of the present invention will become more readily apparent from the following detailed description when taken in conjunction with the accompanying drawings wherein:

FIG. 3b is a side, partial cross-sectional view of the flat profiles of FIG. 3a;

DETAILED DESCRIPTION OF THE DRAWINGS

Figure 1:
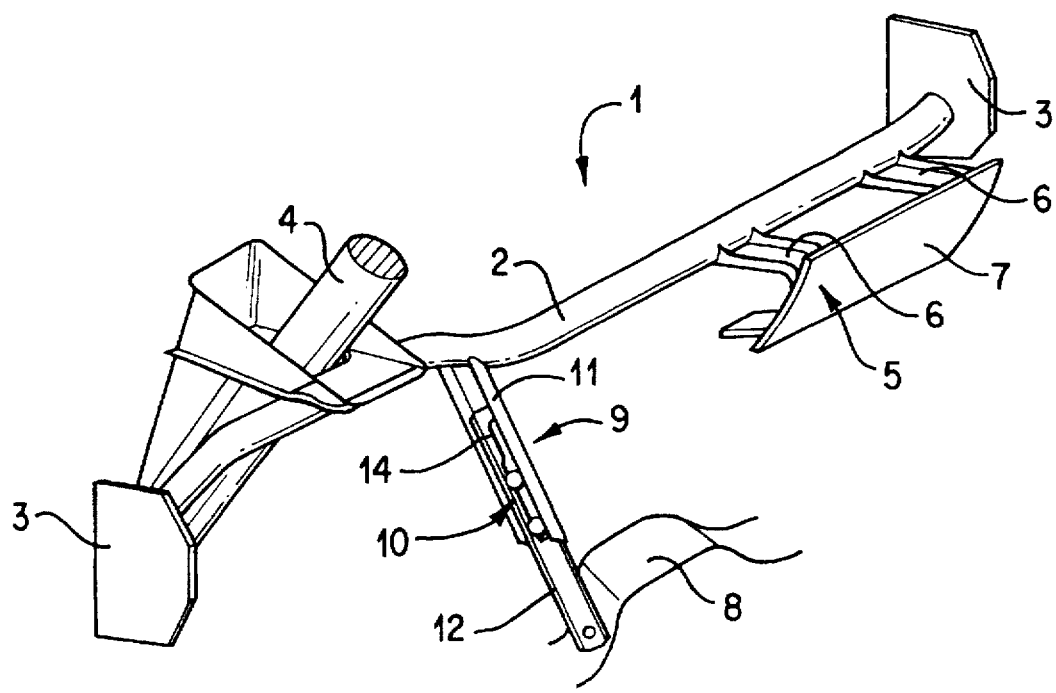
FIG. 1 is a perspective view of a portion around a cross member in a forward structure of a motor vehicle having a strut.

FIG. 1 is a view of a cutout of a forward structure 1 of a motor vehicle in which the arrangement of a tube-shaped cross member 2 can be viewed from the vehicle interior. Each end of the cross member 2 is fastened on the two vehicle A-columns 3 which are shown here only in a section. A steering column 4, which on its upper end carries the steering wheel (not shown), is fastened on the cross member 2. Furthermore, a knee restraint 5 for the front passenger is fastened on the cross member 2 and has two holders 6 bent in a U-shape and which are covered by a deflector plate 7 toward the interior. The bent holders 6 make possible that the deflector plate 7, when loaded during a crash, can yield corresponding to the construction of the holders. As a result, impact energy and load to the knees is reduced. The possible path of the deflector plate 7 in the upward direction and in the direction of the vehicle front, with a simultaneous reduction of energy and with a limited maximal effect of force onto the occupant's knees, is further improved with the present invention as hereinafter described.

A strut 9 is a connection part between the cross member 2 and a raised transmission tunnel 8 extending in the longitudinal direction of the vehicle along the vehicle floor. During a crash which causes a lowering of the transmission tunnel 8 during the deformation of the forward structure 1 of the motor vehicle, the strut 9 pulls the cross member 2 a distance farther in the downward direction. Consequently, the steering column 4 close to the driver is also lowered which is advantageous with respect to his or her impact on the steering wheel or on an inflating steering wheel air bag. This lowering prevents the steering column 4, when loaded, from being pushed away in the upward direction, and the air bag can also not be pushed away along the steering wheel rim.

With an increased tension exercised onto the strut 9 by virtue of the loading of the steering column 4, the knee restraint 5, the cross member 2 or other parts operatively connected therewith, the strut 9 will yield in its connection area 10 between the two strut sections 11, 12. In order to achieve an introduction of force at a constant force level 13 (FIG. 2) after a short time and also a constant energy reduction, a force limiting device 14 is provided in the connection area 10.

Figure 2:
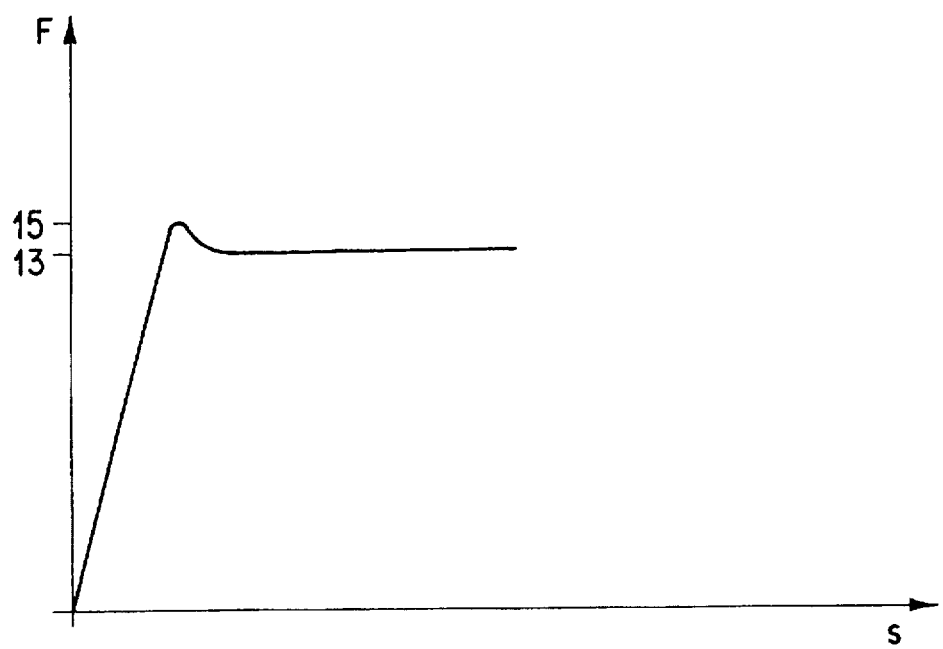
FIG. 2 is a diagram of the path of the force introduction during the strut elongation.

FIG. 2 shows one embodiment of a path or course of force F over the elongation path s of the strut 9. The rising tension force exercised on the strut 9 results in a slight elongation. After a constructively determinable force threshold 15 is reached, characterizing the maximal value of the force to be introduced, the force limiting device 14 is activated. This activation limits the force introduction as well as the energy reduction to a force level 13 in a uniform amount when the strut 9 is elongated further. This means that, when loaded by the occupant's knees, the knee restraint 5, together with the cross member 2, can be displaced in the direction of the vehicle front and in the upward direction. Thereby, impact energy is reduced and the counterforce onto the occupant is limited to the predetermined force level 13. The force level 13 is set, of course, at a value at which the occupant is exposed to a load which is physically still bearable.

Figure 3A:
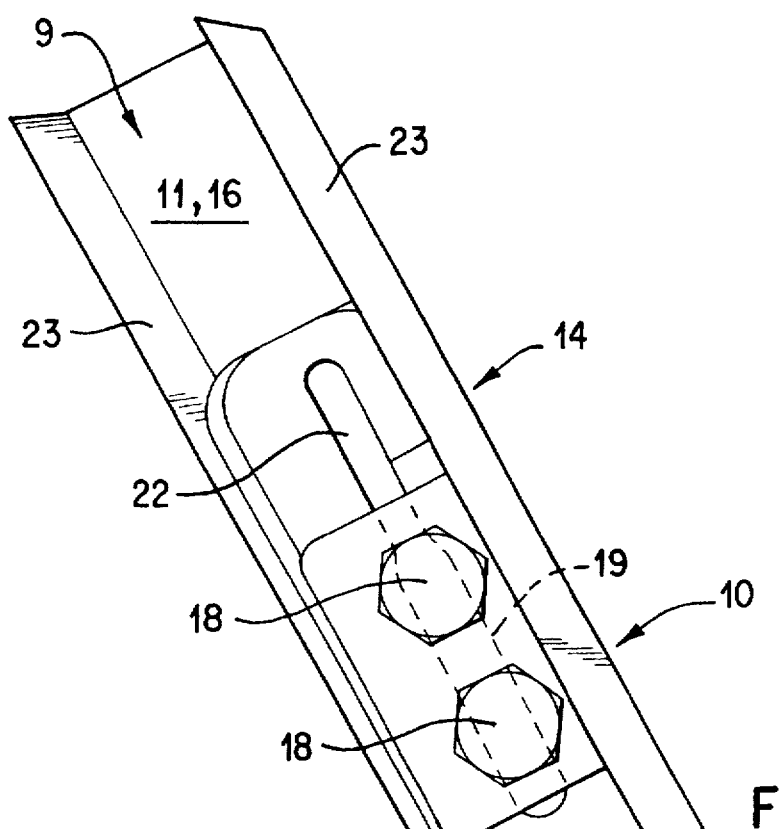
FIG. 3a is a perspective view of one embodiment of the present invention in the form of two strut sections with a flat profile and a force limiting device in the oblong hole of a strut.
Figure 3B:
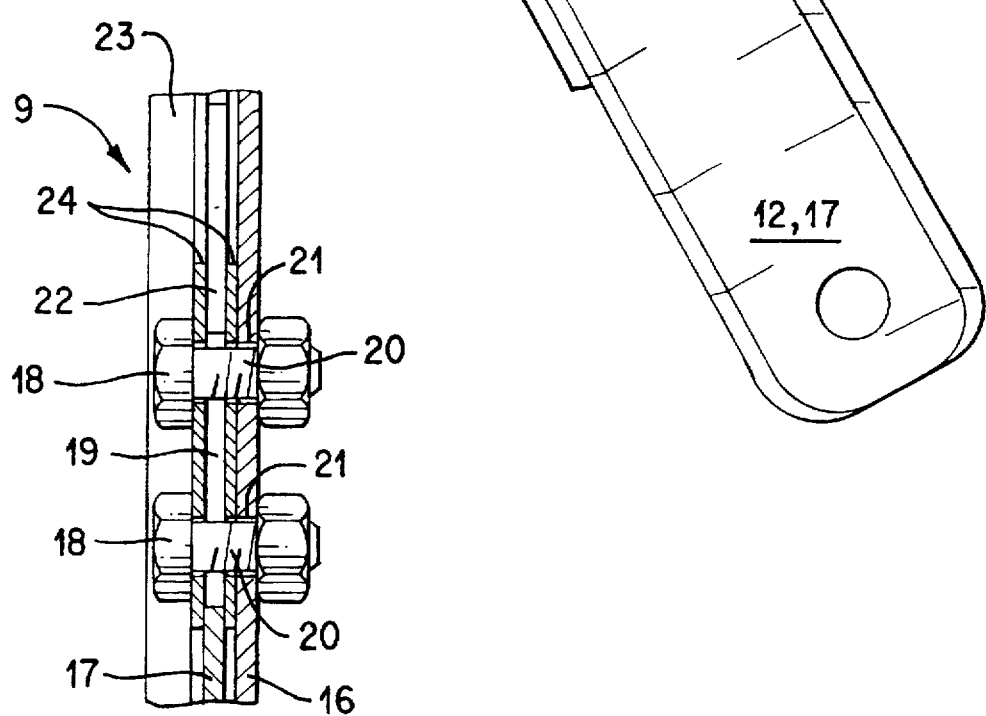

FIGS. 3a and 3b show an embodiment of a force limiting device 14 in which the strut sections 11, 12 are formed by flat profiles 16, 17, respectively, which are disposed on one another in the connection area 10 and which are firmly connected with one another by two bolts 18. The flat profile 17 has an oblong hole 19 through which the bolt shanks 20 project which also extend through bores 21 of the other flat profile 16. When a tensile force is exercised on the strut 9 in excess of the holding force of the bolts 18, the flat profile 17 on the flat profile 16 with a certain frictional resistance of the bolt heads and the nuts is pulled downward. Thereby, the upper one of the bolt shanks 20 is pulled into an oblong hole area 22 which has a smaller width than the bolt shank 20. Now, in its further movement, the bolt shank 20 deforms the oblong hole area 22, with the force required for this purpose being constructionly set to the height of the intended force level 13.

In order to achieve a uniform displacing movement, the flat profile 16 has upward-projecting guide edges 23 for displaceably receiving the flat profile 17. Plates 24 with a predetermined friction coefficient are placed between mutually displaceable surfaces of the flat profiles 16, 17.

Figure 4:
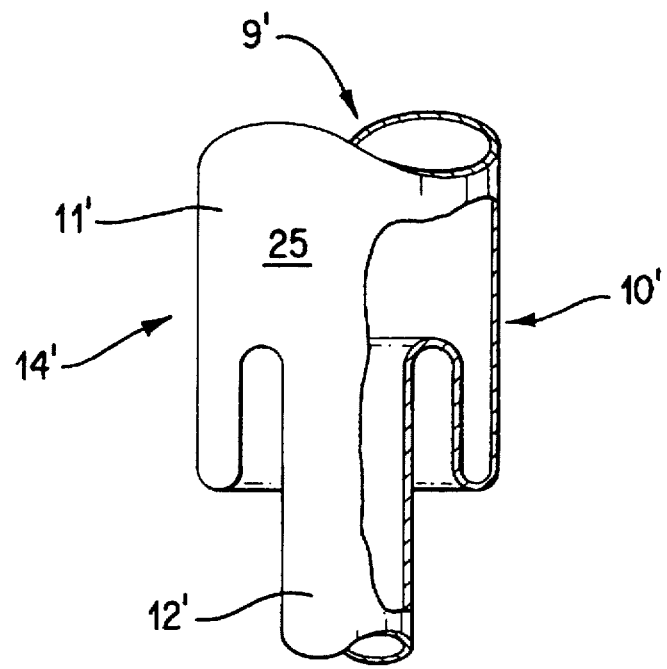
FIG. 4 is a partial cross-sectional view of another embodiment of a connecting tube as a force limiting device in accordance with the present invention.

FIG. 4 shows another embodiment of a force limiting device 14' which is formed by a connecting tube 25 but which is provided here as a connection area 10' between the two strut sections 11', 12' of the strut 9'. The characteristic of the connecting tube 25 is that, with a tensile load, the tube 25 can be pulled apart in the direction of its longitudinal axis while absorbing energy with constant resistance.

Figure 5:
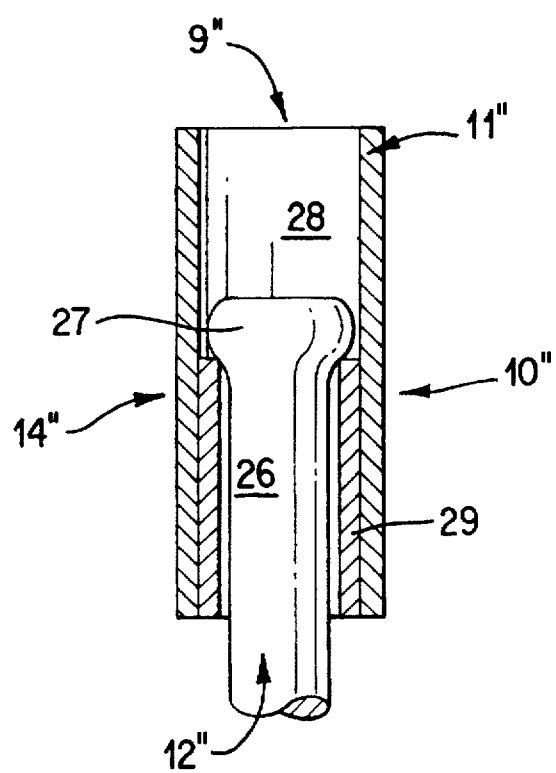
FIG. 5 is a partial cross-sectional view of yet another embodiment of the present invention in which a deformation piston in a tube serves as the force limiting device.

FIG. 5 shows yet another embodiment of a usable force limiting device 14". In the connection area 10", a strut section 12" ends in a rod 26 with an end having a piston 27 projecting into the hollow space of a tube 28 on the other strut section 11". A tensile load exercised on the strut 9" in the axial direction causes the piston 27 to be pulled into a plastic insert 29 in the end section of the tube 28 with constant resistance, and the plastic insert 29 deforms while absorbing energy.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A forward structure of a motor vehicle, comprising a cross member connecting two A-columns and fixing thereon a steering column and a knee restraint, and a strut extending from the cross member to a transmission tunnel extending in a longitudinal direction of the motor vehicle and having mutually overlapping strut sections with a connection area which in the event of a crash load, is configured to be elongated in a longitudinal direction thereof after overcoming a force threshold and absorbing energy, wherein, a force limiting device in a force transmission path in the connection area, provides, after exceeding a force threshold and during a predetermined elongation path of the strut, an energy reduction at a constant force level such that yielding of the knee restraint and the cross member occurs with a force-limited resistance along a predetermined path.

2. The forward structure according to claim 1, wherein the strut sections are formed by flat profiles resting upon one another in the connection area.

3. The forward structure according to claim 2, wherein at least one of the flat profiles has upward—projecting guide edges for displaceably receiving another of the flat profiles.

4. The forward structure according to claim 2, wherein plates are inserted between mutually displaceable surfaces of the flat profiles, and have a predetermined coefficient of friction.

5. The forward structure according to claim 1, wherein at least one of the strut sections in the connection area has an oblong hole in which a fastening bolt engages which projects away from the other strut section and which, during the elongation of the strut, is pulled into an oblong hole area having a smaller width than the fastening bolt.

6. The forward structure according to claim 1, wherein the connection area of the strut sections is a connecting tube configured to be pulled apart during energy absorption.

7. The forward structure according to claim 1, wherein the connection area has a rod on at least one of the strut sections which rod has a piston on an end thereof to project into a tube on another of the strut sections having an end section thereof with a portion deformed during a displacement movement of the piston during energy absorption.

* * * * *